July 7, 1925.

C. DÉ V. GRANT 1,544,976

GAS OR OTHER COOKING OVEN

Filed Feb. 27, 1924

Inventor
Charles de V. Grant.
by Herbert W. Jenner,
Attorney.

Patented July 7, 1925.

1,544,976

UNITED STATES PATENT OFFICE.

CHARLES DÉ VERE GRANT, OF LONDON, ENGLAND, ASSIGNOR OF ONE-HALF TO SIR WILLIAM WILLOUGHBY WILLIAMS, OF LONDON, ENGLAND.

GAS OR OTHER COOKING OVEN.

Application filed February 27, 1924. Serial No. 695,440.

*To all whom it may concern:*

Be it known that I, CHARLES DÉ VERE GRANT, a subject of the King of Great Britain, residing at London, England (whose post-office address is 27 Coram Street, Brunswick Square, London, W. C. 1, England), have invented certain new and useful Improvements in or Relating to Gas or Other Cooking Ovens; and I do hereby declare the following to be a full, clear, and exact description of the invention, such as will enable others skilled in the art to which it appertains to make and use the same.

When baking meat in ordinary gas ovens, there is a tendency for the meat to dry and shrivel up, whereas if aqueous vapour at a high temperature is present in the oven the same qualities are present as produced by roasting in front of a fire, that is to say meat baked under such conditions possesses the full flavour of fire-roasted meat without the loss of weight and plumpness which arises when cooking is effected in an ordinary gas oven.

According to the invention there is provided a device or appliance whereby dry steam is delivered into a gas or other oven of the kind employed for baking meat and other usual cooking operations during a cooking operation. The said device or appliance is constituted by a steam generator in the form of a small vessel arranged, or adapted to be arranged, in a gas oven in such position as to be heated by the gas, the said vessel being formed or provided with a chamber or compartment formed in one with or fixed to the steam generator and extending longitudinally thereof in which chamber or compartment the steam is dried or superheated before admission into the oven.

Conveniently the generator is a small vessel of cast metal and with advantage is so mounted, as to be adjustable in position within the oven. For the purpose of such adjustment the vessel may be mounted to slide on rods that extend across the oven and such rods may be fixed at their ends into metal plates whereby they are supported say just above certain of the gas jets so that the plates become heated and the heat is transmitted through the rods to the generator vessel.

It is also convenient to make the vessel removable and to provide a cradle therefor mounted to slide on the rods and the said rods may be telescopic or otherwise adjustable in length so that the device can be adapted to fit ovens of various sizes.

The accompanying illustrative drawings show by way of example a construction of means embodying the invention.

Figure 1:
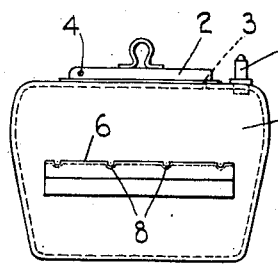
Figs. 1 and 2 show the steam generator in front and end elevation respectively.
Figure 2:
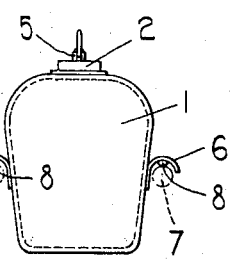

In the example illustrated the generator 1 is made of cast aluminium or other metal, of the cross section shown in Fig. 2. The vessel 1 is provided at its top with a steam drying or superheating chamber or compartment 2 formed in one with or fixed to the vessel 1 and extending longitudinally thereof. The chamber 2 is in free communication, through a small hole 3, with the main or water compartment of the vessel 1. 4 indicates a small hole or nozzle through which the dried or superheated steam can flow into the oven, and 5 indicates a relief valve combined with a screw cap that closes a hole formed in the top of the vessel 1 through which the vessel may be supplied with water Fixed to the sides of the vessel 1 are hook-like flanges 6 whereby the vessel may be supported on rods 7 that extend across the oven. The vessel 1 may be readily moved along the said rods to any desired position and to reduce the friction of the flanges 6 on the rods 7 when moving the vessel along the same, the said flanges are formed with downwardly pressed portions 8 that give point contact on the rods.

Figure 3:
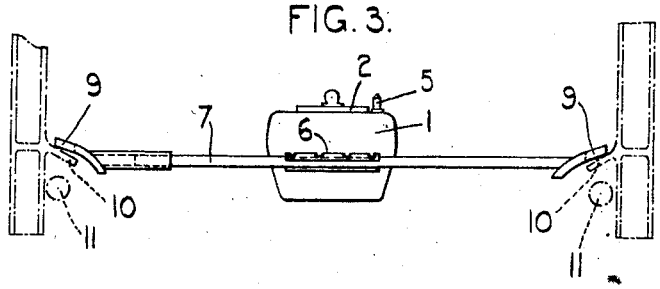
Fig. 3 shows to a smaller scale than Figs. 1 and 2, the generator in position on its supporting rods.
Figure 4:
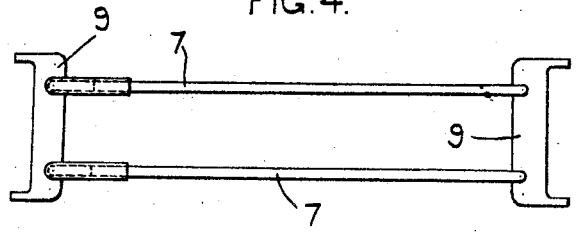
Fig. 4 is a plan of the parts shown in Fig. 3.

The supporting rods 7, see Figs. 3 and 4, are fixed at their ends in metal plates 9 adapted to rest on the usual protecting webs 10 that project inwardly from the sides of a gas oven immediately over the burner tubes 11. When in position, see Fig. 3, gas flames issuing from the holes or nozzles in the burner tubes 11 play upon the metal plates 9 which consequently quickly become very hot and the heat is conducted through the supporting rods 7 to the generator vessel 1.

For the purpose of adjustment in length so that the device can be fitted to gas ovens of various sizes, the rods 7 are arranged to telescope one with the other. A thumb screw or other suitable device may be arranged to prevent relative sliding of the rods after adjustment.

In use, the rods 7 are placed in position near the front of the oven and the vessel 1, charged with water is placed thereon adjacent to one side of the oven where it quickly gets heated by the gas flames. When steam is being generated freely the vessel 1 may be moved away from the side of the oven to a more or less central position on the rods 7.

As the steam issuing from the vessel 1 is superheated it is not visible but by placing a knife blade or other body opposite the hole or nozzle 4 steam playing thereon will at once condense so that in this way it is easy to ascertain whether or not the apparatus is working efficiently.

By arranging the vessel 1 to slide the generator may be moved towards and away from the gas flame as required in order to maintain, when cooking, a steady flow of steam at a high temperature through the hole or nozzle 4.

Numerous modifications may be made in details of construction without departure from the invention.

What I claim is:—

1. A boiler comprising a vessel for water and a steam superheating chamber communicating with it and provided with a steam jet opening, and means for supporting the boiler in a cooking oven.

2. A boiler comprising a vessel for water and a steam superheating chamber communicating with it and provided with a steam jet opening, and a horizontal support on which the said boiler is slidable, said support being adapted to sustain the boiler in a cooking oven.

3. A boiler provided with a steam jet outlet opening and having laterally projecting lugs on its sides, and means for supporting the boiler in a cooking oven comprising a pair of parallel rods spaced apart to straddle the boiler under the said lugs and having their ends secured to two heating plates adapted to rest on projections in the oven over the gas burner tubes by which it is heated.

In testimony whereof I affix my signature.

CHARLES DÉ VERE GRANT.